US007903916B2

(12) United States Patent
Hioki et al.

(10) Patent No.: US 7,903,916 B2
(45) Date of Patent: Mar. 8, 2011

(54) OPTICAL WAVEGUIDE

(75) Inventors: Tsuyoshi Hioki, Kanagawa-ken (JP); Yutaka Nakai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/411,823

(22) Filed: Mar. 26, 2009

(65) Prior Publication Data

US 2009/0245741 A1 Oct. 1, 2009

(30) Foreign Application Priority Data

Mar. 27, 2008 (JP) .................................. 2008-083289

(51) Int. Cl.
*G02B 6/02* (2006.01)
(52) U.S. Cl. .......... 385/123; 385/124; 385/125; 385/126; 385/127
(58) Field of Classification Search ............... 385/123, 385/124, 125, 126, 127
See application file for complete search history.

(56) References Cited

U.S. PATENT DOCUMENTS

| 6,282,335 | B1* | 8/2001 | Losch et al. | 385/16 |
| 6,775,449 | B2* | 8/2004 | White | 385/123 |
| 7,715,675 | B2* | 5/2010 | Fabian et al. | 385/128 |
| 2003/0138209 | A1* | 7/2003 | Chan | 385/37 |
| 2005/0231680 | A1 | 10/2005 | Hioki et al. | |
| 2009/0243344 | A1 | 10/2009 | Clephas et al. | |

OTHER PUBLICATIONS

U.S. Appl. No. 12/686,037, filed Jan. 12, 2010, Hioki, et al.
U.S. Appl. No. 12/493,560, filed Jun. 29, 2009, Hioki, et al.

* cited by examiner

*Primary Examiner* — Jennifer Doan
(74) *Attorney, Agent, or Firm* — Oblon, Spivak, McClelland, Maier & Neustadt, L.L.P.

(57) ABSTRACT

The invention relates to an optical waveguide capable of extracting light especially from arbitrary positions of the same. An object of the invention is to provide an optical waveguide capable of extracting light efficiently from arbitrary positions of the same. To achieve the above object and according to one aspect of the invention, an optical waveguide is provided with a core for guiding light, a clad and a displacing structure for the core to contact the clad. The core has a first refractive index. The clad has a second refractive index higher than the first refractive index.

12 Claims, 17 Drawing Sheets

US 7,903,916 B2

OPTICAL WAVEGUIDE

CROSS REFERENCE TO RELATED APPLICATION

The application is based upon and claims the benefit of priority from the prior Japanese Patent Application No. 2008-83289, filed on Mar. 27, 2008, the entire contents of which are incorporated herein by reference.

FIELD OF THE INVENTION

The invention relates to an optical waveguide capable of extracting light especially from arbitrary positions of the same.

DESCRIPTION OF THE BACKGROUND

Thin-shaped information displays are being demanded at the present time, resulting in implementations of so-called Flat Panel Displays (FPDs). The FPDs include a Liquid Crystal Display (LCD), Plasma Display Panel (PDP), Organic Light Emitting Display (OLED), Field Emission Display (FED), etc. These FPDs differ from each other in mechanisms or methods, such as a light emitting mechanism and an optical valve method, but it is common among the FPDs that optical modulation is performed electrically at respective pixels arranged two-dimensionally on a panel to control light emitted outward from the pixels, and to display images and pictures, etc. These displays need to be provided with an optical valve and a light emitting element at a position corresponding to each pixel, a sophisticated manufacturing process like, e.g., a photoetching process being adopted.

A new display device has been proposed and examined to reduce such a manufacturing load of the sophisticated process. In the display device, light is preliminarily modulated to be guided through a core of an optical waveguide according to total reflections in the core. The light is extracted from a desired position of the core by means of changing a local refractive index at the position of the core. The display device also allows it to reduce the manufacturing load so that what is necessary is just to provide a light extracting element at a position corresponding to each pixel, and the light modulation, i.e., adjustment of light intensity can be made by a light source only.

Japanese laid-open patent application JP-A 1989-193595 (Kokai) disclosed that an element for changing total reflection conditions is provided with a core, upper and lower clads and electrodes disposed on the clads. The core is a multilayer with respective Si and SiN layers laminated by turns, each layer having a thickness of tens of angstroms. The clad covers the surface and rear surface of the core. The electrodes are provided on the clad so that a set of the electrodes is arranged on the surface of the upper clad in a prescribed pitch and in a direction, and the other set is arranged on the surface of the lower clad in a prescribed pitch and in the other direction intersecting with the direction. Furthermore, a planer core is connected with an external light source through a light-intensity modulating device provided to the light source.

The display thus provided modulates light emitted from the light source using the light-intensity modulating device provided to the light source, and the modulated light is guided through the core to a position of a predetermined pixel according to total reflections. The guided light is extracted outward at the position of the core of which refractive index is changed by applying a voltage to the electrodes arranged at each pixel, as the total reflection condition is broken at the position due to the voltage application.

However, the display device disclosed by the Japanese laid-open patent application has an issue that the core indicates only a small change in its refractive index with respect to the voltage application. Lithium niobate ($LiNbO_3$) is often used for a core material having a variable refractive-index, but indicates at most several % changes in the refractive index with respect to a normal voltage-range.

In the related art described above, the refractive index of the core must be changed in order to extract light guided through the core. However, it is difficult to change the refractive index sufficiently so as to extract light, causing a problem that only a small amount of the guided light can be extracted applying a normal-range voltage.

SUMMARY OF THE INVENTION

An object of the invention is to provide an optical waveguide capable of extracting light efficiently from arbitrary positions of the same.

To achieve the above object and according to one aspect of the invention, an optical waveguide is provided with a core for guiding light, a clad and a displacing structure to make the core contact the clad. The core has a first refractive index. The clad has a second refractive index higher than the first refractive index.

BRIEF DESCRIPTION OF DRAWINGS

The accompanying drawings, which are incorporated in and constitute a part of this specification, illustrate embodiments of the invention and together with the description, serve to explain the principles of the invention.

DETAILED DESCRIPTION OF THE INVENTION

Figure 1:
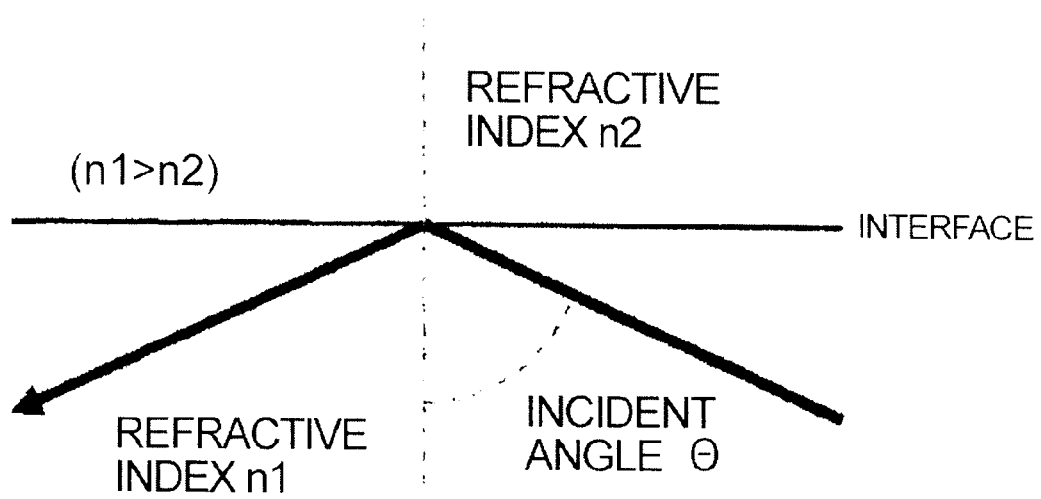
FIG. 1 is a schematic view to explain a case where total reflection conditions are met.

Embodiments of the invention will be described below with reference to accompanying drawings. Wherever possible, the same reference numerals will be used to denote the same or like parts throughout figures.

A principle to guide light via an optical waveguide and to extract the light in this embodiment is explained with reference to FIG. 1 and FIG. 2. In general, light traveling through substances is reflected totally at an interface between two different substances with different refractive indexes $n_1$ and $n_2$ in some cases. If $n_1 > n_2$, the interface reflects totally the light incoming from n1 layer to n2 layer with an incident angle θ, provided that θ satisfies the following equation (1) and in equation (2).

$$\sin\theta_m = n2/n1 \quad (1)$$

$$\theta > \theta_m \quad (2)$$

Here, $\theta_m$ is called a critical angle, meaning a minimum incident angle for the total reflection. When an incident angle is larger than the critical angle, the total reflection takes place at the interface. Therefore, light travels inside the optical waveguide by undergoing total reflections repeatedly only when the following conditions are met.

1) The waveguide includes a light traveling region and a low refractive-index region, the low refractive-index region coating the light traveling region.
2) The light is incident on the interface between the light traveling region and the low refractive-index region at an incident angle larger than the critical angle.

Figure 2:
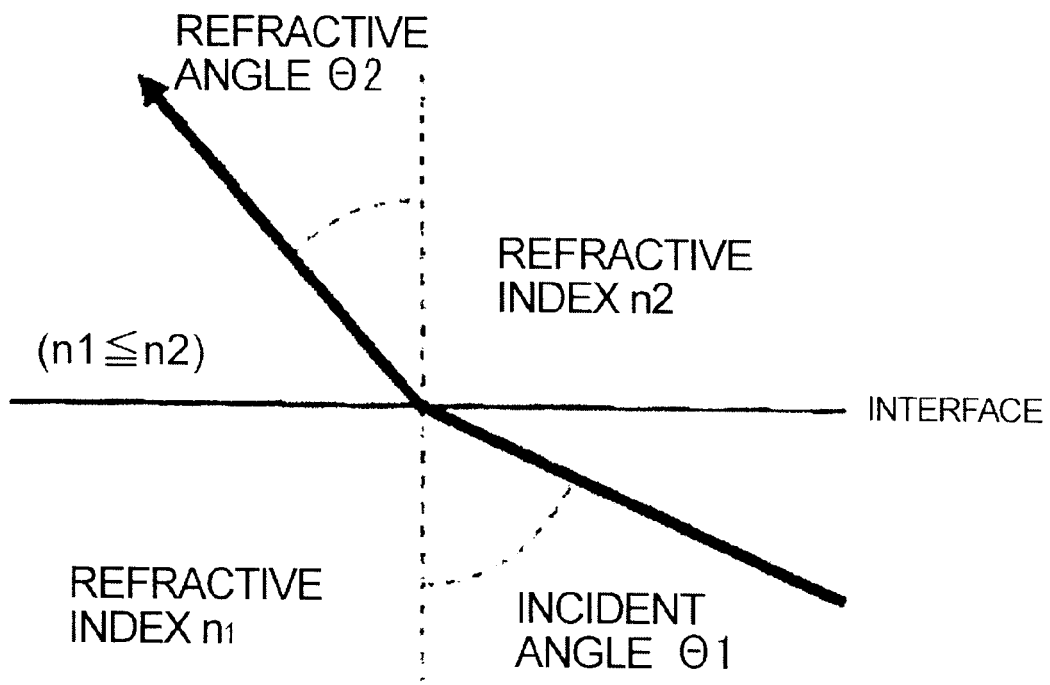
FIG. 2 is a schematic view to explain a case where total reflection conditions are not met.

On the other hand, when light is incident on the n2 layer at an incidence angle θ1 from the n1 layer in a substance having two different refractive indexes n1 and n2 as shown in FIG. 2, the light is refracted to travel the n2 layer with satisfying the following equation (3) under the condition $n1 \leq n2$.

$$\sin\theta 1/\sin\theta 2 = n2/n1 \quad (3)$$

In addition, θ2 is generally called a refraction angle, and the light incident from the n1 layer is refracted at this angle θ2 to travel through the n2 layer. That is, under the condition $n1 \leq n2$, total reflections do not take place, and light always travels from the n1 layer to the n2 layer while satisfying the equation (3). When the light traveling region is in contact with a region having a larger refractive index than that of the light traveling region, light is not reflected totally at the interface between the two regions to pass through the interface.

Based on the above principle, embodiments of the invention will be explained below with reference to FIGS. 3 to 37C.

First Embodiment

First, an optical waveguide is explained with reference to FIGS. 3 to 11 according to a first embodiment of the invention.

Figure 3:
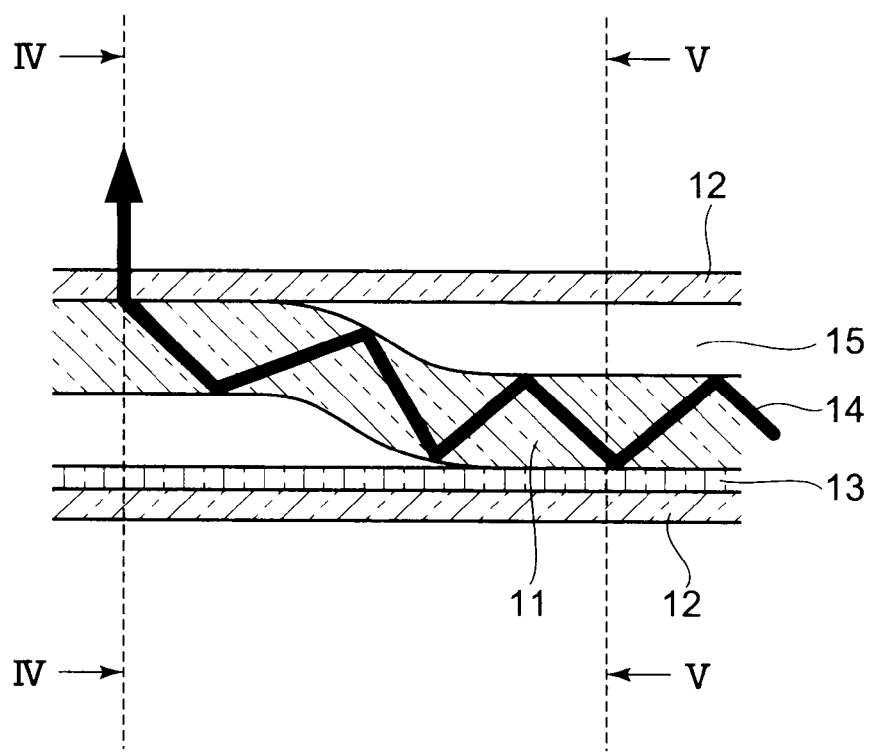
FIG. 3 is a sectional view taken along a longitudinal direction of an optical waveguide according to a first embodiment of the invention.
Figures 4, 5:
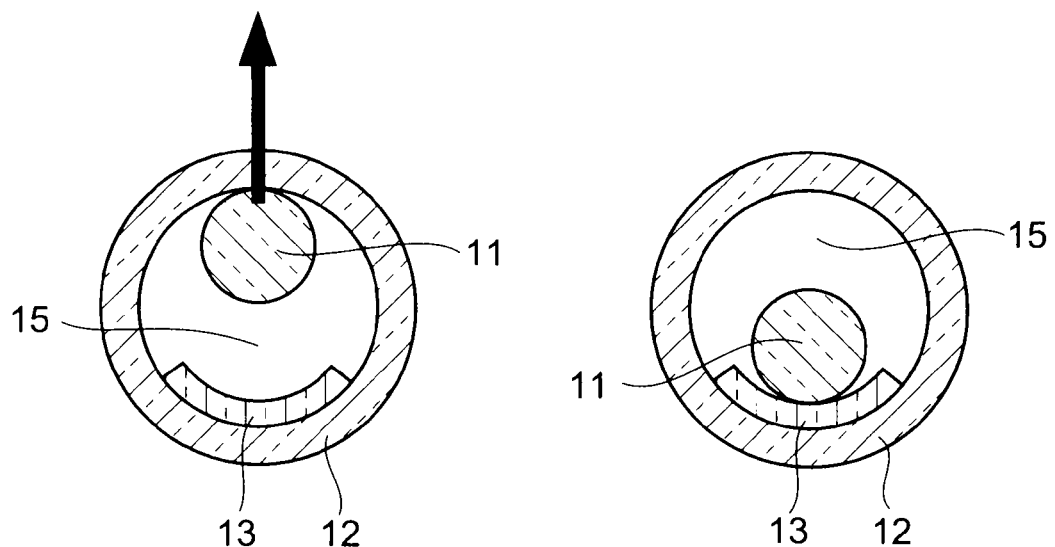
FIGS. 4 and 5 are sectional views taken along the dashed lines IV-IV and V-V of FIG. 3, respectively.

FIGS. 3 to 5 show the optical waveguide according to the first embodiment of the invention. FIG. 3 is a sectional view taken along a longitudinal direction of the optical waveguide. FIGS. 4 and 5 are sectional views taken along the dashed lines IV-IV and V-V of FIG. 3, respectively.

In the embodiment, a line-shape structure widely used in an optical-communication field, i.e., fiber structure is employed in order to show features of the invention. Hence, an external shape of a clad is cylindrical.

As shown in FIGS. 3 to 5, the optical waveguide of the first embodiment guides light, and includes a core 11 with a first refractive index, a clad 12 with a second refractive-index higher than the first refractive index, and a displacing structure to make the core 11 contact the clad 12. The above-mentioned "guide" means that light travels through the core 11 in a longitudinal direction of the core, and has the same meaning, hereinafter. The "displacing structure" will be explained specifically later.

The core 11 is inserted into the inside of the clad 12 that is hollow-cylindrical in shape. The diameter of the core 11 is smaller than the inner diameter of the clad 12. Moreover, a low refractive-index portion 13 with a third refractive index lower than that of the core 11 is formed partially on an inner wall of the clad 12. Furthermore, the core 11 is configured so that the core 11 can be freely displaced in a radial direction inside the clad 12 by a displacing structure.

An extracting method of light from the optical waveguide is explained according to the first embodiment.

Laser light 14 emitted from a laser light source is incident on the core 11 from an end of the optical waveguide. Then, the core 11 is disposed so that the core 11 may be covered with the low refractive-index portion 13 and the air 15 whose refractive index is lower than that of the core 11. The Laser light is incident on the core 11 from the end of the optical waveguide, and travels inside the core 11 with undergoing total reflections repeatedly. In this example, the laser light source is used as a light source by taking advantage of a feature that the light source can be separated from each pixel. However, the example is not limited to this to optionally use a light emitting diode (LED) as the light source.

The displacing structure that is provided outside the clad 12 allows it to displace a local portion of the core 11 so that the local portion contacts the clad 12. Since the core 11 is formed of a material with a refractive index lower than that of the clad 12, light will travel from the core 11 into the clad 12 at the position of the local portion without total reflections.

Then, it becomes possible to extract light from the optical waveguide efficiently by providing the core 11 and the clad 12 so as to make larger a difference between the first and second refractive indexes of the core 11 and the clad 12, respectively. For the reason, it is required to choose materials carefully for the core 11 and the clad 12. For example, when polymethylmethacrylate (PMMA) with a refractive index of about 1.5 and lead glass containing Pb with a refractive index of about 1.9 are used for the core 11 and the clad 12, respectively, the difference can be set to 0.4 between the core 11 and the clad 12.

Figure 6:
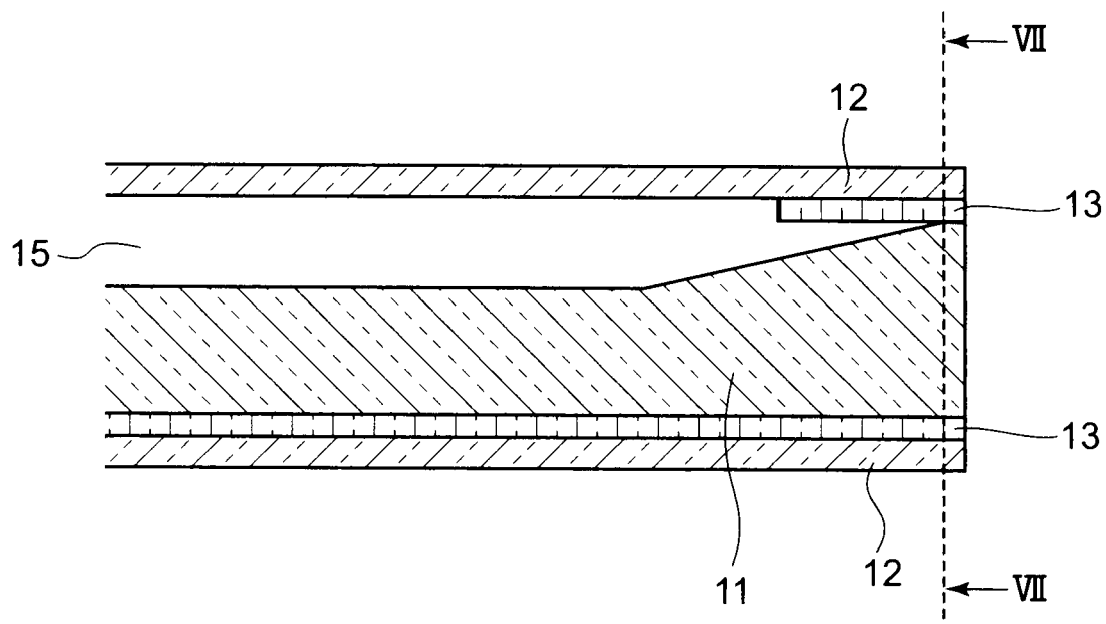
FIG. 6 is a sectional view taken along a longitudinal direction of an end portion of an optical waveguide according to the invention.
Figure 7:
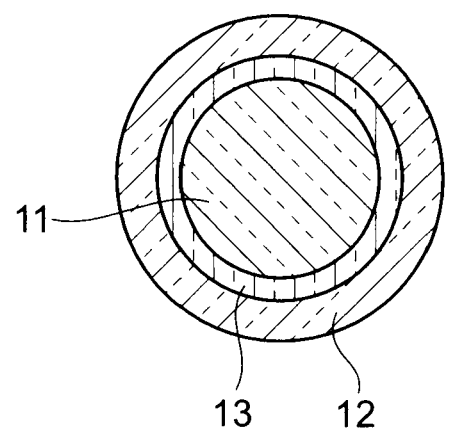
FIG. 7 is a sectional view taken along the dashed lines VII-VII of FIG. 6.

The end portion of the optical waveguide is a light inlet, and the refractive index of the core 11 is lower than that of the clad 12 in the optical waveguide of this embodiment. Hence, the contact between the core 11 and the clad 12 in the end portion of the optical waveguide leads to a leakage of light in the end portion. This prevents a sufficient amount of the laser light 14 emitted by the light source from traveling through the core 11. Therefore, it is necessary to prevent the core 11 from contacting the clad 12 in the end portion of the optical waveguide. Then, as shown in FIGS. 6 and 7, the diameter of the core is increased to be formed so that the core may be covered with the low refractive-index portion 13 in the end portion of the optical waveguide of this embodiment. The low refractive-index portion 13 can be provided by coating fluorine resin consisting of perfluoroethylene propylene copolymer whose refractive index is about 1.3, for example. This allows the low refractive-index portion 13 to keep its refractive index low. The refractive index of the portion 13 is 1.3 and is lower than that of the core 11, 1.5. This also allows the laser light 14 to be prevented from leaking from the optical waveguide, thus realizing an efficient incidence of light from the light source into the core 11. Moreover, the air 15 has a refractive index of 1 which is lower than respective refractive-indexes of the core 11, the clad 12 and the low refractive-index portion 13. Therefore, total reflection conditions are met at the interface between the core 11 and the air 15, allowing it to guide light inside the core 11. In addition, the air 15 is contained in a space between the core 11 and the clad 12 of the example, but the invention is not limited to this example. Other gases or liquids may be used instead of the air to allow the core 11 to be displaced.

Figure 8A:
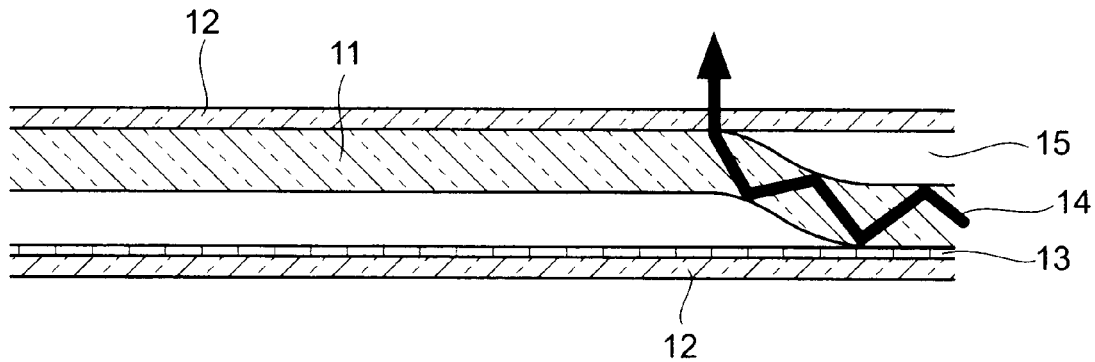
FIGS. 8A to 8C are schematic views to explain a principle for moving a light extracting position according to the optical waveguide of the first embodiment.
Figure 8B:
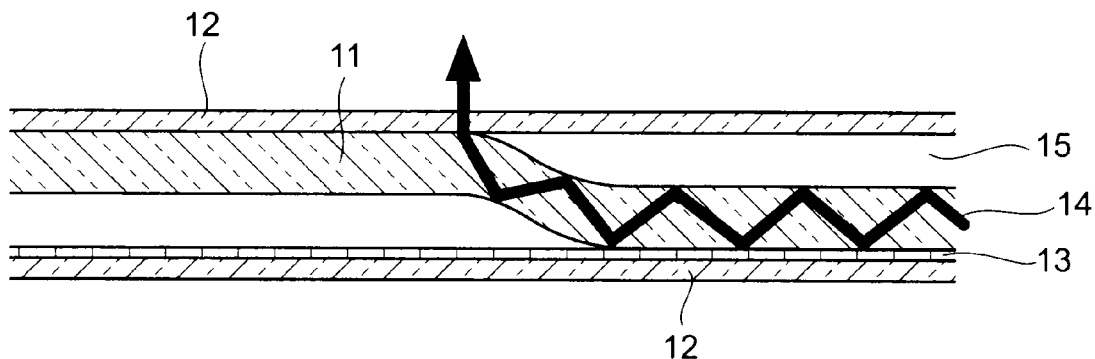
Figure 8C:
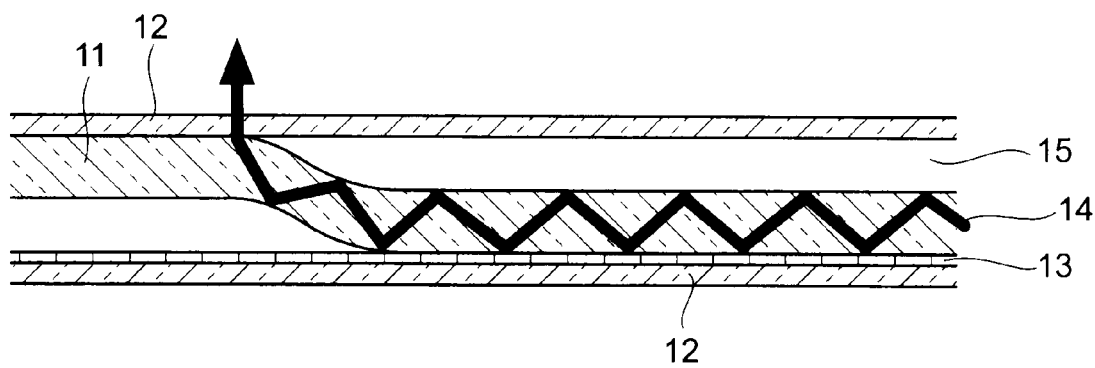

As described above, the optical waveguide according to the first embodiment is provided with the displacing structure to make a portion of the core 11 in contact with the clad 12 having a higher refractive-index. Here, the core 11 is covered with the air 15 or the low refractive-index portion 13. Then, the refractive index of the clad 12 is made to be 1.3 times larger than that of the core 11. The clad 12 configures a high refractive-index portion of the waveguide. This allows it to extract light efficiently through the high refractive-index portion in contact with the core 11. Moreover, it is also possible to move the light extracting position continuously by moving temporally a position where the core 11 is in contact with the high refractive-index portion, i.e., the clad 12, as shown in FIGS. 8A to 8C.

Next, the displacing structure is explained with reference to FIGS. 9 to 11.

Figure 9:
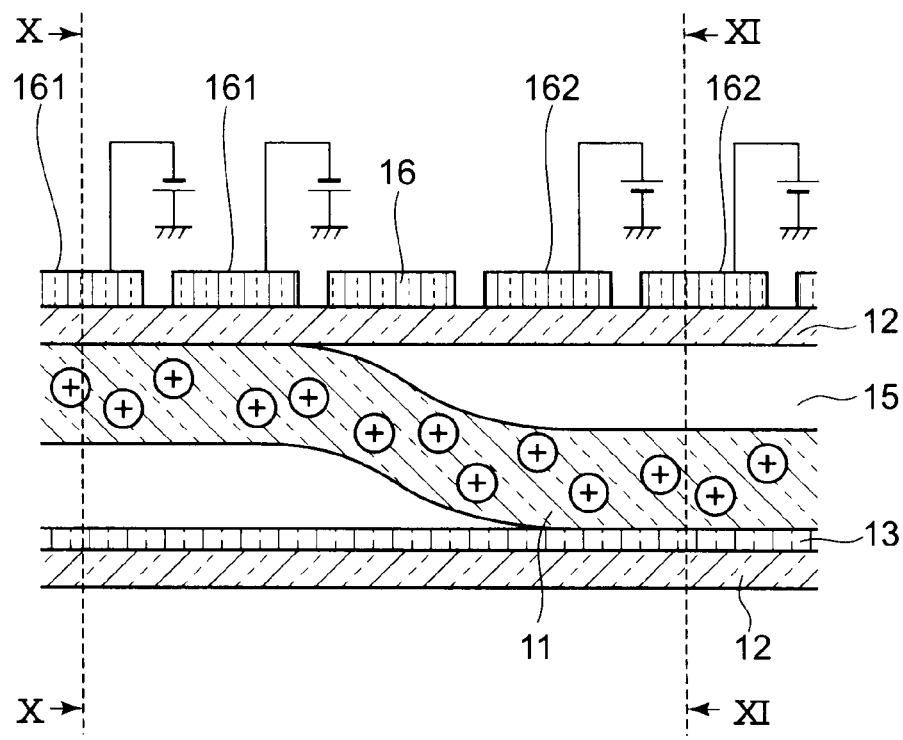
FIG. 9 is a sectional view taken along a longitudinal direction of an optical waveguide of the first embodiment which is provided with a displacing structure.
Figures 10, 11:
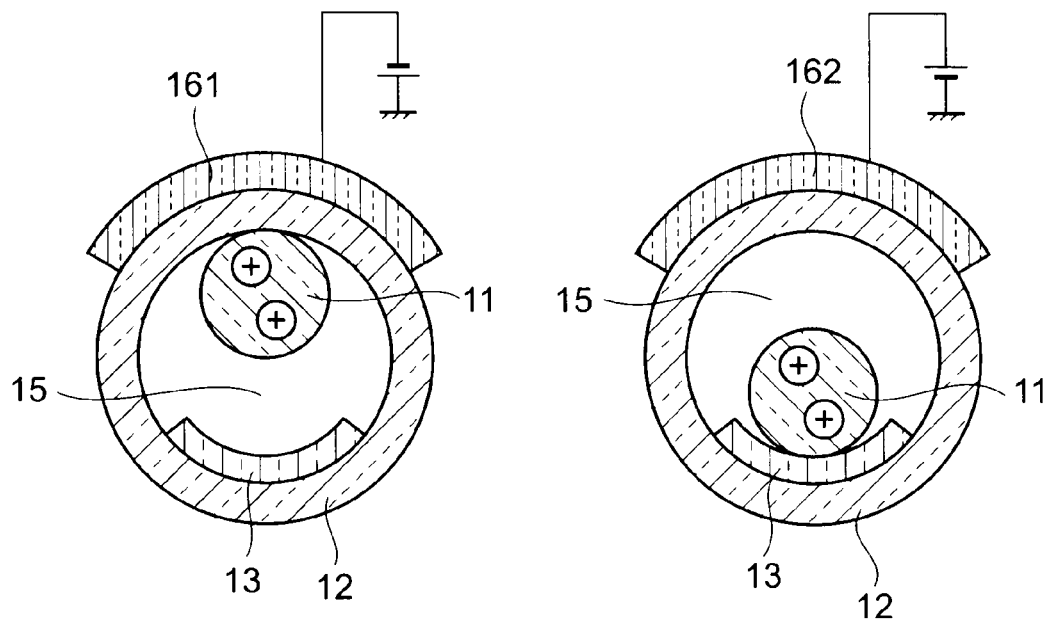
FIGS. 10 and 11 are sectional views taken along the dashed lines X-X and XI-XI of FIG. 9, respectively.

FIGS. 9 to 11 show the above-mentioned optical waveguide which is provided with the displacing structure. FIG. 9 is a sectional view taken along a longitudinal direction of the optical waveguide, and FIGS. 10 and 11 are sectional views taken along the dashed lines X-X and XI-XI of FIG. 9, respectively.

As shown in FIGS. 9 to 10, an electrode 16 can be used as the displacing structure. That is, the optical waveguide is provided with two or more electrodes 16 (161, 162) of indium tin oxide (ITO). The electrodes are formed along the longitudinal direction of the optical waveguide at a constant interval on the exterior of the clad 12. The core 11 charged positively, e.g., by rubbing is inserted into the clad 12.

A voltage is applied to the electrodes 16 of the optical waveguide formed in this way as shown in FIGS. 9 to 11. Thus, the voltage is applied to generate an electric field inside the clad 12. On the other hand, the core 11 is charged positively, and is therefore attracted toward the electrode 161 to contact the clad 12, because the core 11 is beneath the electrode 161 and a negative voltage has been applied to the core 11. When a positive voltage has been applied to the electrode 162, the core 11 beneath the electrode 162 is repelled by the electrode 162 to contact the low refractive-index portion 13.

As mentioned above, charging the core 12 and applying a desired voltage to the two or more electrodes 16 provided on the exterior of the clad 12 allow a portion of the core 11 to be displaced so as to contact the clad 12. Since the refractive index of the clad 12 is made to be about 1.3 times that of the core 11, it is possible to extract light efficiently from the portion of the core 11 being in contact with the clad 12. Moreover, it is also possible to move the displaced position of the core 11 by adjusting polarities and timings of voltage applications, allowing the light extracting position to travel continuously, as shown in FIGS. 8A to 8C.

Next, a manufacturing method of the optical waveguide is explained according to the first embodiment.

The pipe-shaped clad 12 with inside and outside diameters of 0.7 mm and 1 mm, respectively, is formed using fused silica glass with germanium added as shown in FIGS. 3 to 5. Germanium is added to increase the refractive index of the glass, the glass having a refractive-index of 1.7. The fused silica glass with germanium added has high workability at temperatures higher than its glass-transition temperature as a material of the clad 12 to be worked easily.

Next, the inner wall of the clad 12 is entirely coated with fluorine polymer which is a low dielectric-constant material with a refractive index of about 1.3.

The fluorine polymer coated entirely to the inner wall of the clad 12 is locally irradiated with laser from the outside of the clad 12. The laser radiation removes the fluorine polymer partially from the inner wall to form the low refractive-index portion 13 partially on the inner wall of the clad 12, while entirely on the inner wall of the end portion of the clad 12.

On the other hand, a drawing process is carried out for polymethylmethacrylate (PMMA) with a refractive index of about 1.5 to form the core 11 with a diameter of 0.5 mm. Since PMMA is organic, it is relatively easy to form a fiber-shaped core from PMMA, the fiber-shaped core having a diameter smaller than the inner diameter of the clad 12.

After forming the core 11 and clad 12, as mentioned above, the core 11 is inserted into the inside of the clad 12 to provide the optical waveguide shown in FIGS. 3 to 5.

Since the embodiment employs a fiber-shape entirely, the clad 12 is formed to be cylindrical in shape, but the clad shape of the invention is not limited to this. For example, it is also possible to make two different clads sandwich spacers, and then to dispose cores which can be displaced in the gap between the two clads.

Figure 12:
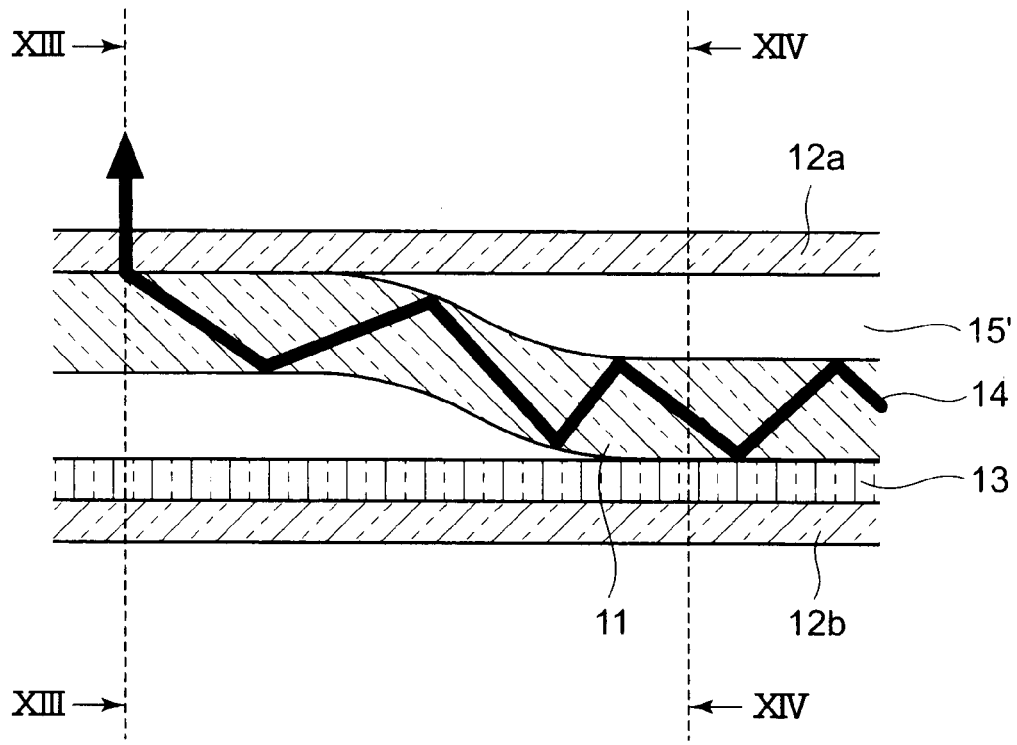
FIG. 12 shows a modified example of the optical waveguide according to the first embodiment of the invention.
Figure 13:
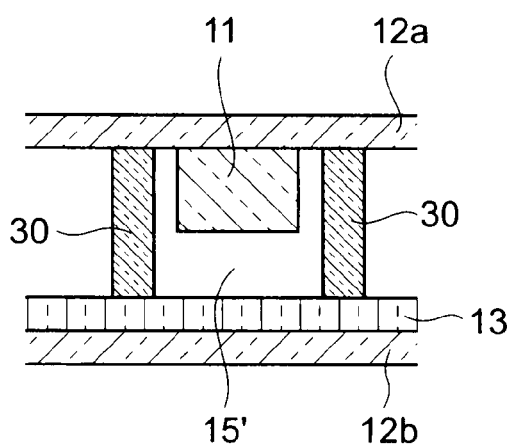
FIGS. 13 and 14 are sectional views taken along the dashed lines XIII-XIII and XIV-XIV of FIG. 12, respectively.
Figure 14:
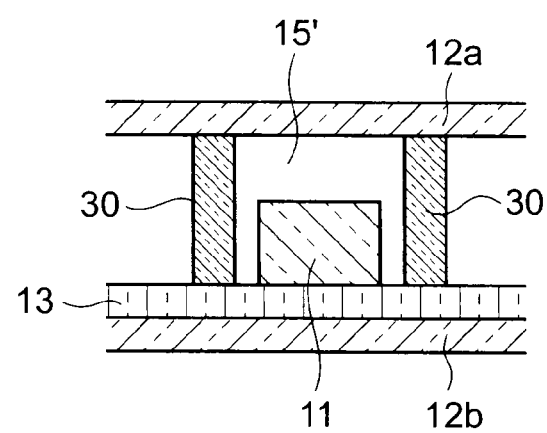

This example is shown in FIGS. 12 to 14. FIG. 12 is a sectional view taken along a longitudinal direction of this optical waveguide. FIGS. 13 and 14 are sectional views taken along the dashed lines XIII-XIII and XIV-XIV of FIG. 12, respectively. The two clads 12a and 12b sandwich the spacers 30 made of, e.g., resin posts (super spacer), and the core 11 is disposed in the gap 15 thus formed. The operation according to a modified example of the embodiment is the same as that described above, explanations being omitted. The clad surfaces 12a and 12b are flat in the embodiment shown in FIGS. 12 to 14, making it easy to add further structures onto the surfaces.

Second Embodiment

Next, an optical waveguide is explained with reference to FIGS. 15 to 17C according to a second embodiment of the invention. In addition, the optical waveguide according to the second embodiment of the invention features a light extracting method, while the structure, displacing structure and manufacturing method of the optical waveguide are supposed to be the same as those of the first embodiment, explanations on them being omitted.

Figure 15:
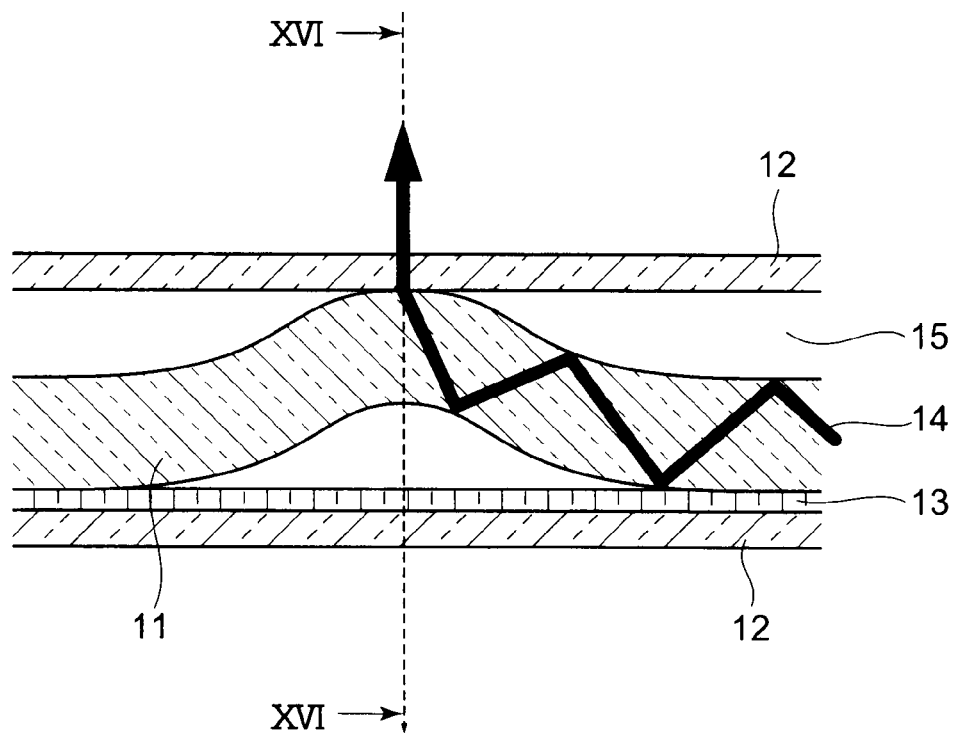
FIG. 15 is a sectional view taken along a longitudinal direction of an optical waveguide according to a second embodiment of the invention.
Figure 16:
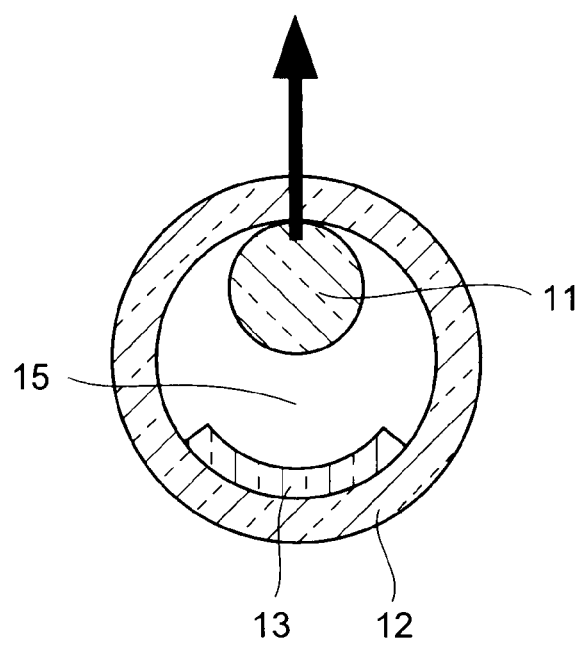
FIG. 16 is a sectional view taken along the dashed line XVI-XVI of FIG. 15.

FIGS. 15 and 16 show the optical waveguide according to the second embodiment of the invention. FIG. 15 is a sectional view taken along a longitudinal direction of this optical waveguide. FIG. 16 is a sectional view taken along the dashed line XVI-XVI of FIG. 15.

Figure 17A:
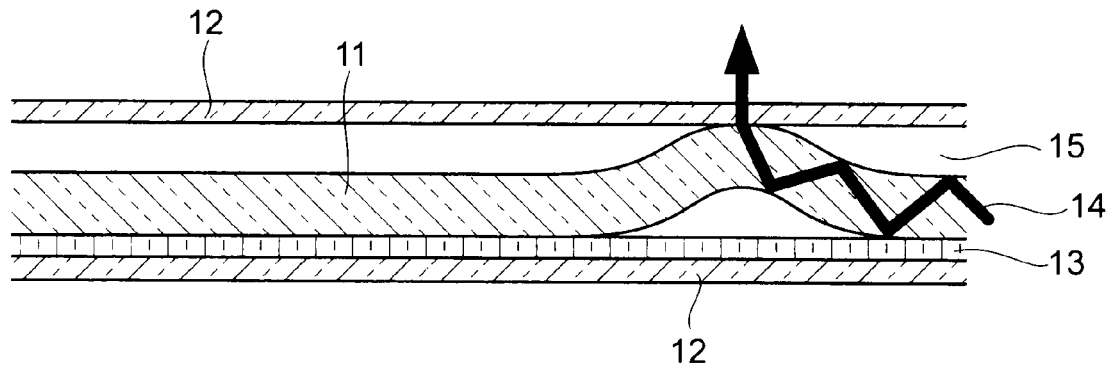
FIGS. 17A to 17C are schematic views to explain a principle for moving a light extracting position according to the optical waveguide of the second embodiment.
Figure 17B:
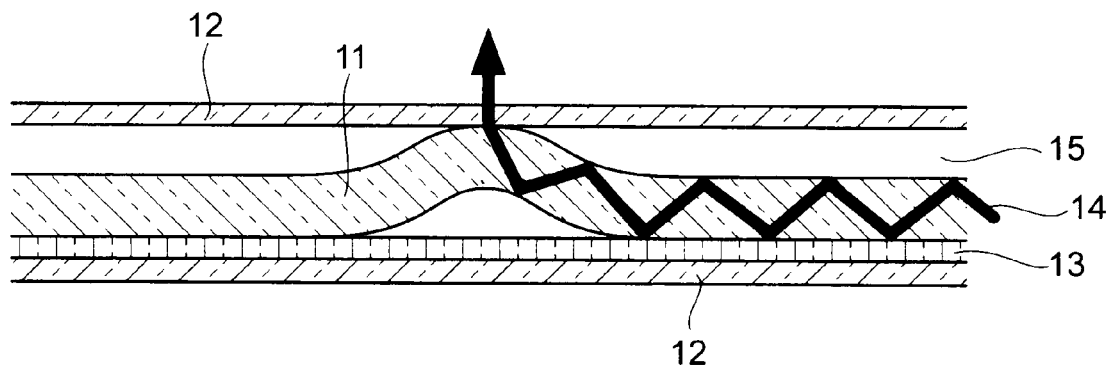
Figure 17C:
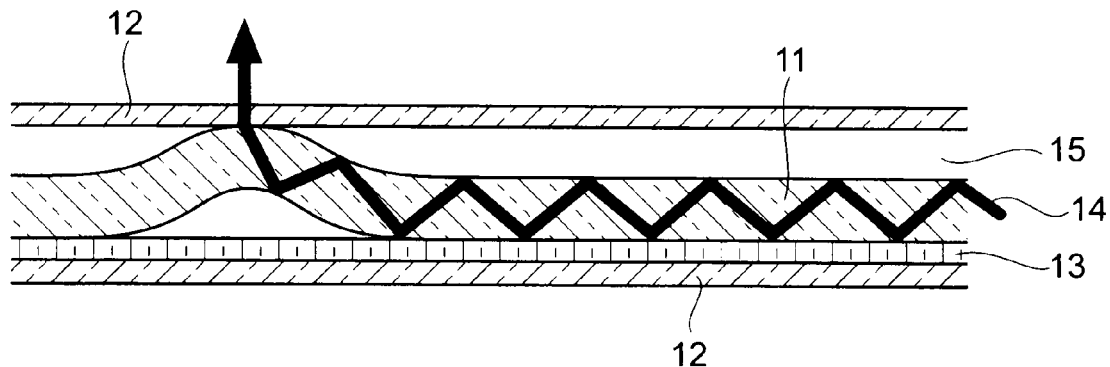

As shown in FIGS. 15 and 16, the optical waveguide according to the second embodiment has a feature that the core 12 can be displaced so as to be in contact with the clad 12 at a given position by appropriately adjusting the polarity of a voltage applied to the electrode 16. The arrangement of the electrodes 16 in FIGS. 15 and 16 is supposed to be the same as that in FIGS. 9 to 11, being omitted here. Since the second refractive index of the clad 12 is higher than the first refractive index of the core 11, light guided by the core 11 is not reflected totally at a contact point where the core 11 is displaced to contact the clad 12, passing through the clad 12. Materials for the core 11 and the clad 12 are selected so as to make larger the difference between the first and second refractive indexes of the core 11 and the clad 12, allowing the guided light to be extracted more efficiently. In addition, when the core 11 is made to contact just one point of the clad 12, it is possible to reuse the light that has been not extracted to travel through the inside of the core 11. When something like a silver mirror is disposed on the end side opposite to the light inlet of the core 11, the light not extracted at the point of the core 11 being in contact with the clad 12 is guided to travel through the inside of the core 11 to the end side, being reflected thereon and guided again through the core 11 in the opposite direction. It is also possible to re-extract the reflected light described above at the contact point where the core 11 is in contact with the clad 12, and to reuse the reflected light. This allows it to extract two components of incident and reflected light simultaneously at the contact point, resulting in the extracted and re-extracted light brighter than that in the first embodiment. Moreover, a displaced point of the core 11 can be moved with time by adjusting polarity and timings of the voltage application to continuously move a light extracting position, as shown in FIGS. 17A to 17C. The "contact point" does not mean a complete point defined in mathematics but has a small area in the scope of the invention.

Third Embodiment

Next, an optical waveguide is explained with reference to FIGS. 10A and 10B according to a third embodiment of the invention.

Figure 18:
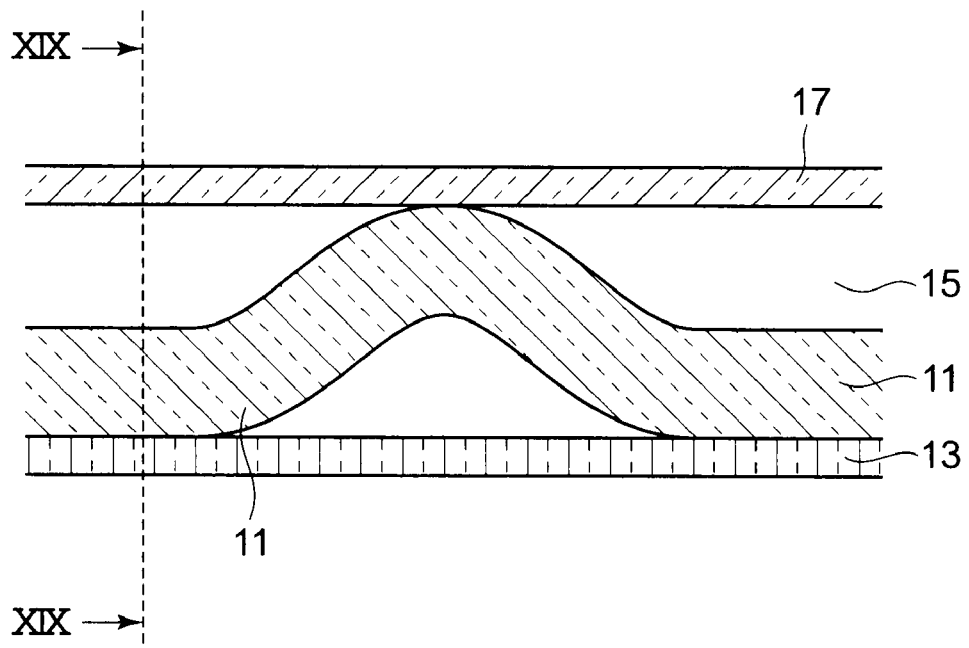
FIG. 18 is a sectional view taken along a longitudinal direction of an optical waveguide according to a third embodiment of the invention.
Figure 19:
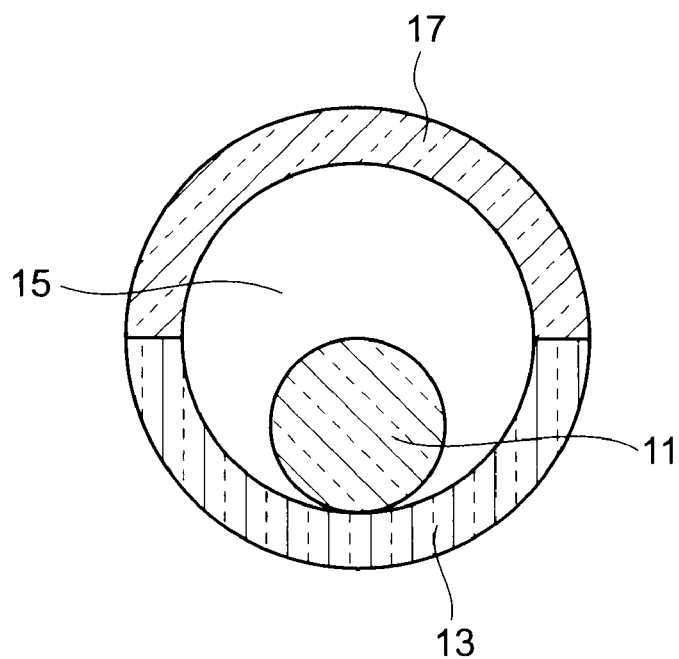
FIG. 19 is a sectional view taken along the dashed line XIX-XIX of FIG. 18.

FIGS. 18 and 19 show the optical waveguide according to the third embodiment of the invention. FIG. 18 is a sectional view taken along a longitudinal direction of this optical waveguide. FIG. 19 is a sectional view taken along the dashed line XIX-XIX of FIG. 18.

As shown in FIGS. 18 and 19, the optical waveguide according to the third embodiment has a feature that a low refractive-index portion 13 is included as a part of the clad 12 to be unified with the clad 12, in comparison with the optical waveguide according to the first or second embodiment. In the first or second embodiment, the clad 12 has the second refractive index higher than the first refractive index of the core 11 over the whole body of the clad 12, and it is possible to extract light from a contact point where the core 11 is in contact with the clad 12. On the contrary, the clad 12 is provided with two distinct portions in the third embodiment. One of the two is the higher refractive-index portion 17 capable of extracting light, and the other is the lower refractive-index portion 13 incapable of extracting light.

That is, the clad of the optical waveguide is a hollow cylinder in shape according to the third embodiment. The clad 12 is provided with the high refractive-index portion 17 having a second refractive-index not lower than the first refractive-index of the core 11 and the low refractive-index portion 13 having a third refractive index lower than the first refractive index. And the fiber-shaped core 11 is inserted inside the clad. The diameter of the core 11 is smaller than the inner diameter of the clad. Furthermore, the core 11 has a refractive index higher than the refractive index of the low refractive-index portion 13, and is configured so that the core 11 can be freely displaced radially inside the clad by the displacing structure.

According to the third embodiment, the optical waveguide is formed as follows. The diameters of the core ends are enlarged so that the core ends are covered entirely with the low refractive-index portion 13, as well as in the first embodiment. These core ends can prevent a leakage of light incident on the core 11 in both ends, ensuring efficient incidence of light into the core 11 from a light source.

Even such a structure allows it to extract light from a contact point where the core 11 is in contact with the high refractive-index portion 17 of the clad 12 by displacing the core 11 so as to contact the high refractive-index portion 17 of the clad 12 at the contact point, as well as in the light extracting method described in the second embodiment. Then, it becomes possible to extract light from the optical waveguide efficiently at the contact point by providing the core 11 and the high refractive-index portion 17 of the clad 12 so as to make larger a difference between the refractive indexes of the core 11 and the portion 17. Moreover, it is also possible to move the light extracting position by moving the position where the core 11 is in contact with the high refractive-index portion 17 of the clad 12, as well as in FIGS. 17A to 17C. In the third embodiment, making the core 11 in contact with the high refractive-index portion 17 of the clad 12 regionally also allows light to be extracted efficiently from the position where the core 11 is in contact with the high refractive-index portion 17 of the clad 12, as well as in the light extracting method of the first embodiment.

Moreover, a manufacturing method of the optical waveguide according to the third embodiment is supposed to be mostly the same as that according to the first embodiment, detailed explanations about the method being omitted here. Instead, a forming method of the clad is explained.

Two flat sheets of fused silica glass with germanium added and fused silica glass with boron added are bonded adhesively at a high temperature. The high temperature allows it to control interdiffusion of germanium and boron to some degree at the interface between the two flat sheets. Portions containing germanium and boron correspond to the high and low refractive-index portions 17 and 13, respectively, in FIGS. 18 and 19.

The whole glass thus bonded is machined to obtain a cylinder solid of the glass with a diameter larger than a desired one so that the portions containing germanium and boron are disposed to each predetermined location.

An entire central portion of the cylinder solid is hollowed to obtain a preform for the clad 12. The preform is drawn using an optical-fiber drawing machine to obtain a hollow cylinder. Since fused silica has high workability above its glass-transition temperature, the preform is well drawn at a temperature higher than the glass-transition temperature. This allows it to obtain the clad 12 having a hollow-cylinder shape with a designed diameter.

The clad 12 is thus formed for the optical waveguide according to the third embodiment. On the other hand, the core 11 is formed in the same way as in the first embodiment, and the core is finally inserted into the inside of the clad 12, thus allowing it to acquire the optical waveguide shown in FIGS. 18 and 19.

Fourth Embodiment

Figure 20:
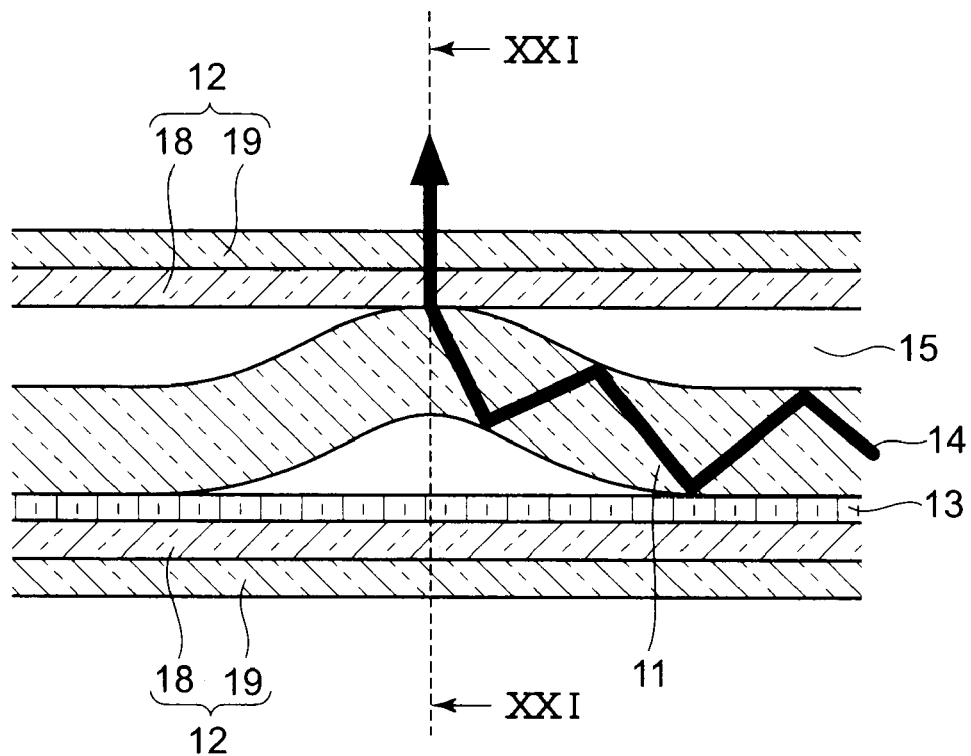
FIG. 20 is a sectional view taken along a longitudinal direction of an optical waveguide according to a fourth embodiment of the invention.
Figure 21:
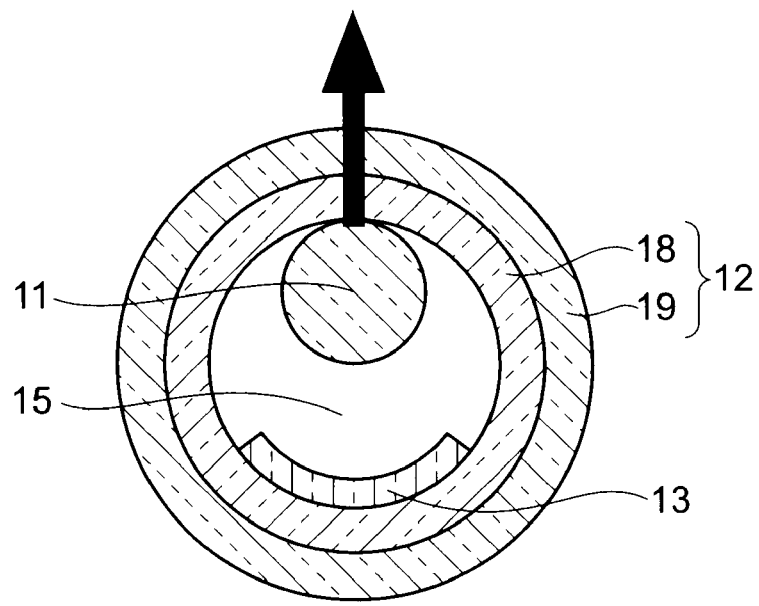
FIG. 21 is a sectional view taken along the dashed line XXI-XXI of FIG. 20.

An optical waveguide is explained according to a fourth embodiment of the invention with reference to FIGS. 20 and 21.

FIGS. 20 and 21 show the optical waveguide according to the fourth embodiment of the invention. FIG. 20 is a sectional view taken along a longitudinal direction of this optical waveguide. FIG. 21 is a sectional view taken along the dashed line XXI-XXI of FIG. 20.

As shown in FIGS. 20 and 21, the optical waveguide according to the fourth embodiment has a feature that a clad 12 has a laminated structure, the clad of this embodiment corresponding to the clad 12 of the first and second embodiments. The clad 12 of the fourth embodiment is formed of two cylindrical clads. The inner cylindrical clad 18 has a second refractive-index higher than the first refractive-index of the core 11. The outer cylindrical clad 19 is formed to cover the inner clad 18, having a fourth refractive-index higher than the second refractive-index. The portion 13 has the third refractive-index. These four refractive-indexes satisfy the following order.

The third refractive index<first refractive index≦second refractive index≦fourth refractive index When the clad 18 with the lower second refractive-index and the clad 19 with the fourth refractive-index higher than the second one can be regarded entirely as a single clad, the entire refractive-index of the single clad 12 is considered to correspond to the second refractive-index of the clad 12. Thus the fourth embodiment can be regarded as a modified example of the first embodiment. That is, in order to extract light from the core 11 with the first refractive-index, it is possible to dispose two or more clads as the clad 12 so as to make higher the refractive-indexes of the two or more clads in a stepwise or continuous fashion from the inside towards the outside over the section of the clad 12.

The outer cylindrical clad 19 is formed to cover the inner clad 18 entirely, having a refractive-index higher than that of the clad 18. The refractive-index of the inner clad 18 is made to be higher than the refractive-index of the core 11. This allows it to desirably adjust an output angle of extracted light. When $n_l$ and $n_h$ represent refractive-indexes of the clads 18 and 19, respectively; and $\theta_l$ and $\theta_h$ represent an incident angle from the clad 18 and an output angle to the clad 19, respectively, these parameters $n_l$, $n_h$, $\theta_l$ and $\theta_h$ satisfy the following equation.

$$n_l \cdot \sin\theta_l = n_h \cdot \sin\theta_h$$

Therefore, it is possible to extract light in a designed direction by adjusting $n_l$ and $n_h$ to control the output angle.

In addition, the extracting method of light is the same as that in the first or second embodiment. Moreover, a manufacturing method of the optical waveguide according to the fourth embodiment is supposed to be mostly the same as that in the first embodiment, a detailed description on the method being omitted. The clad 12 may be obtained using a preform with two materials having different refractive-indexes laminated to be drawn as described above.

Figure 22:
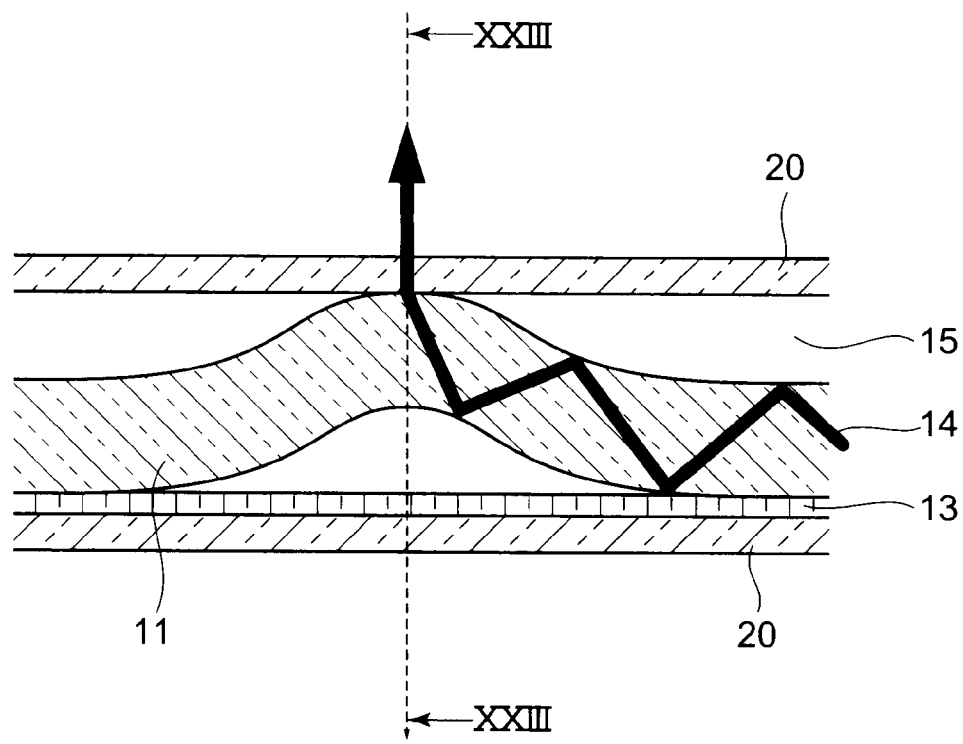
FIG. 22 is a sectional view taken along a longitudinal direction of a modified example of an optical waveguide provided with a clad having scattering particles.
Figure 23:
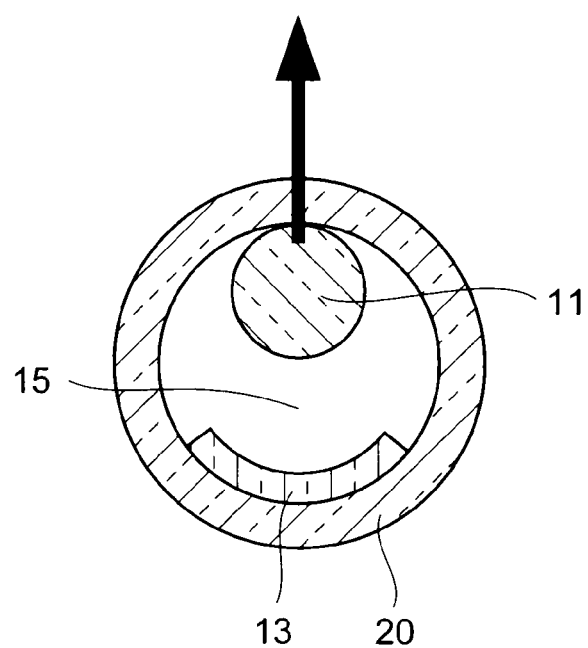
FIG. 23 is a sectional view taken along the dashed line XXIII-XXIII of FIG. 22.

In the fourth embodiment, the clad 12 is formed of the laminated materials to extract light at a designed angle. On the contrary, it is possible to disperse fine particles of, e.g., zinc oxide for light scattering in the clad 12 of the second embodiment, e.g., as shown in FIGS. 15 and 16. The clad 20 thus formed allows it to extract a uniform light without directional characteristics due to the scattering particles of zinc oxide, as shown in FIGS. 22 and 23. FIG. 22 is a sectional view taken along a longitudinal direction of this optical waveguide. FIG. 23 is a sectional view taken along the dashed line XXIII-XXIII of FIG. 22. The scattering particles mean particles capable of scattering light which travels from the core 11 into the clad 12 to change the light paths. That is, it is particularly important to change light paths based on refractive-index differences or reflections at interfaces between the clad 12 and the particles included in the clad 12. Since the refractive index of zinc-oxide particles is different from a refractive index of 1.9 of lead glass to constitute the clad 12, traveling directions of light change at interfaces between the zinc-oxide particles and the lead glass, due to the difference between their refractive indexes. The zinc-oxide particles have interfaces doing various angles with respect to the longitudinal direction of the clad 12 due to their particle shapes, allowing it to scatter light. Moreover, it is preferable that the particle diameters are 400 nm or larger but not larger than the thickness of the clad 12. This is because some particles with smaller diameters out of the above-described range have a less refracting effect. It is preferable that a volume fraction of the particles is 5% or more. This is because an excessively low content of the particles prevents from acquiring a sufficient scattering effect. It is preferable not only to make the particles disperse entirely over the clad 12, but also to localize the particles only in a portion of the clad 12 necessary to extract light.

Although the optical waveguides according to the embodiments of the invention have been explained above, embodiments of the invention are not limited to these, and can be modified variously.

Figure 24:
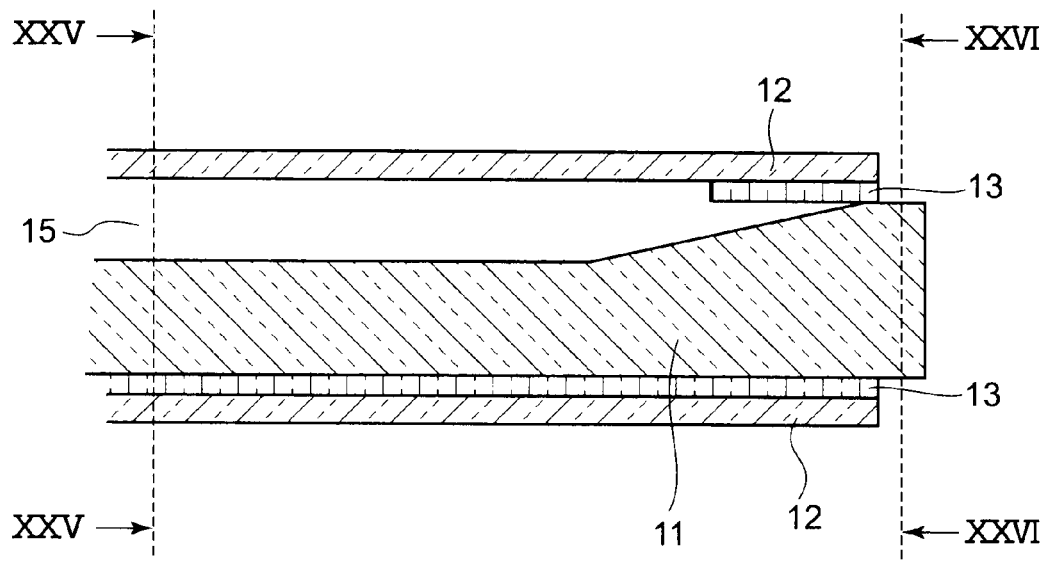
FIG. 24 is a sectional view taken along a longitudinal direction of a modified example of an end of the optical waveguide of the invention.
Figures 25, 26:
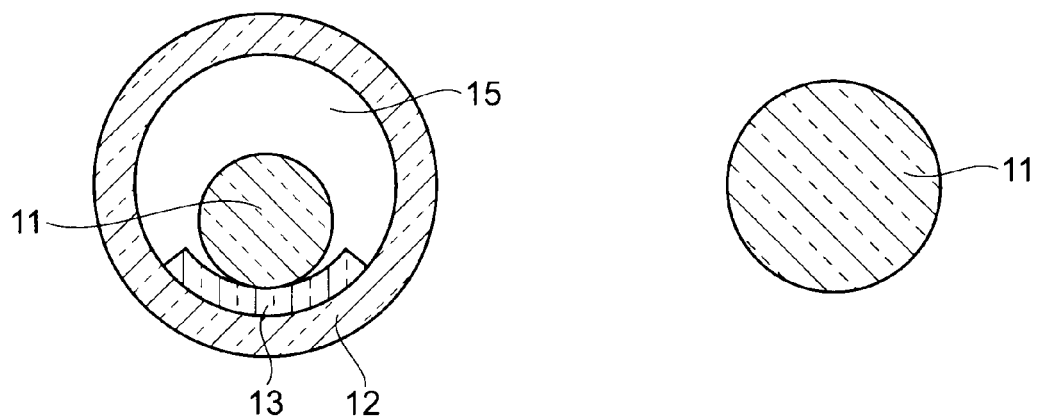
FIGS. 25 and 26 are sectional views taken along the dashed lines XXV-XXV and XXVI-XXVI of FIG. 24, respectively.

For example, the end of the optical waveguide is configured to have the core 11 covered with the low refractive-index portion. However, since the core 11 should just be covered with a material having a refractive index lower than that of the core 11, e.g., as shown in FIGS. 24 to 26, the end of the core 11 may be formed so that the end of the core 11 may protrude out of the opening of the clad 12 in order to take in light efficiently. FIG. 24 is a sectional view taken along a longitudinal direction of a modified example of an end of the optical waveguide of the invention. FIGS. 25 and 26 are sectional views taken along the dashed lines XXV-XXV and XXVI-XXVI of FIG. 24, respectively.

As described above, the displacing structure corresponds to two or more electrodes 16 provided on the exterior of the clad 12, displacing the electrically charged core 11 via an electric field by applying a voltage to the electrodes 16. The displacing structure just generates an electric field around the charged core 11. Hence, the electrodes 16 may be formed also as shown in FIGS. 27 to 36 concerning the optical waveguide according to each embodiment mentioned above.

Figure 27:
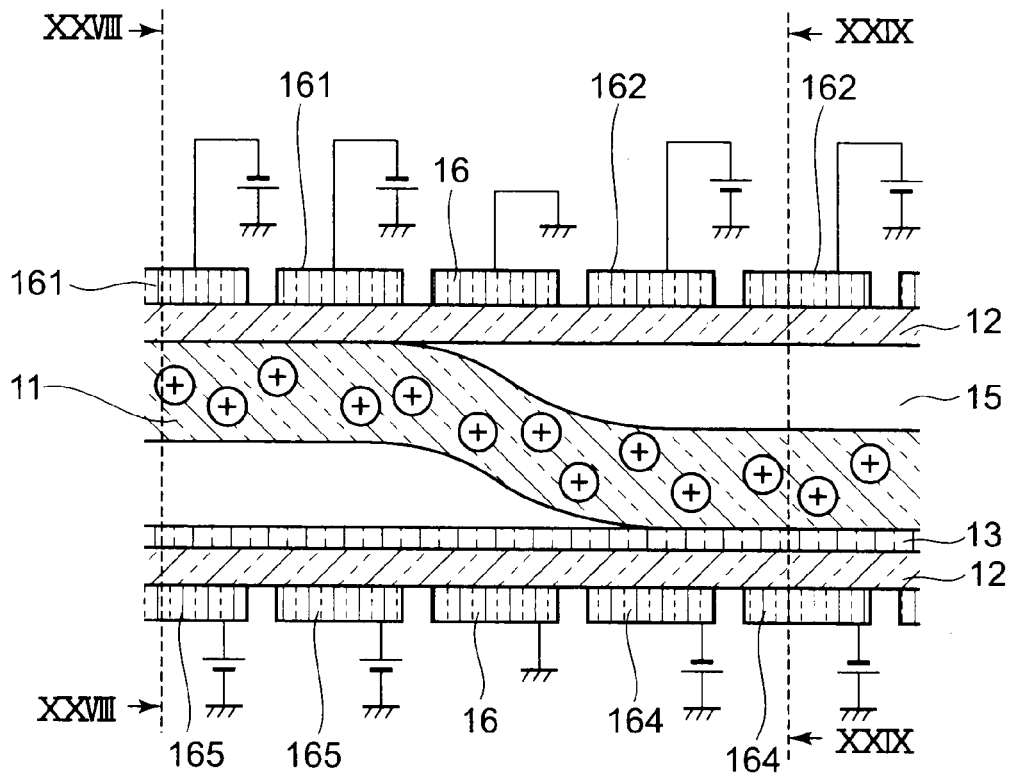
FIG. 27 is a sectional view taken along a longitudinal direction of a modified example of the optical waveguide with a displacing structure.
Figures 28, 29:
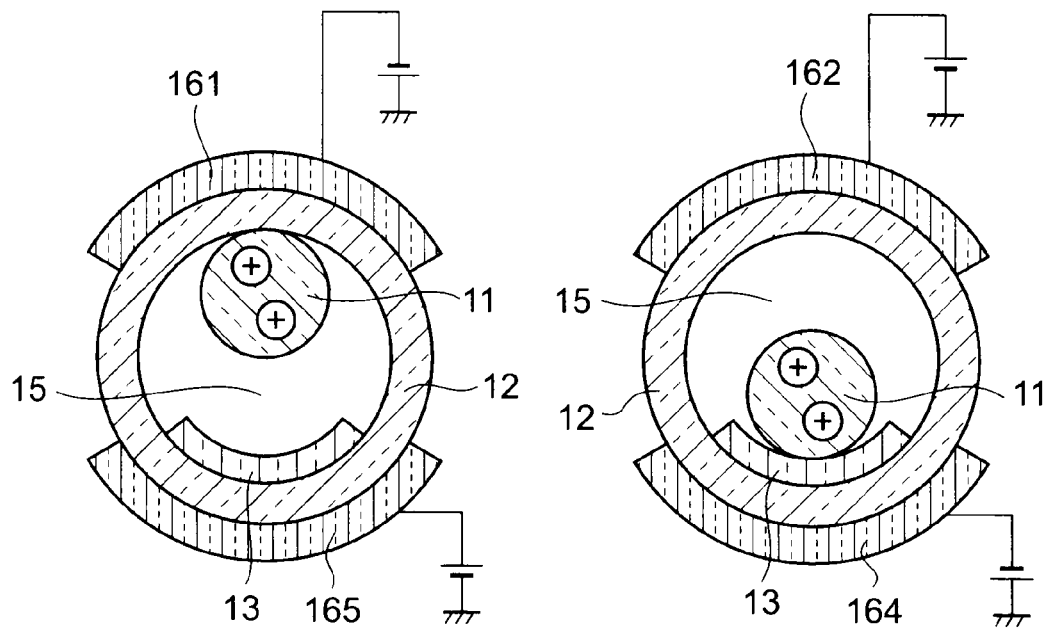
FIGS. 28 and 29 are sectional views taken along the dashed lines XXVIII-XXVIII and XXIX-XXIX of FIG. 27, respectively.

FIGS. 27 to 29 show a modified example of the electrodes 16 to be formed. FIG. 27 is a sectional view taken along a longitudinal direction of a modified example of the optical waveguide with a displacing structure. FIGS. 28 and 29 are sectional views taken along the dashed lines XXVIII-XXVIII and XXIX-XXIX of FIG. 27, respectively.

Figure 30:
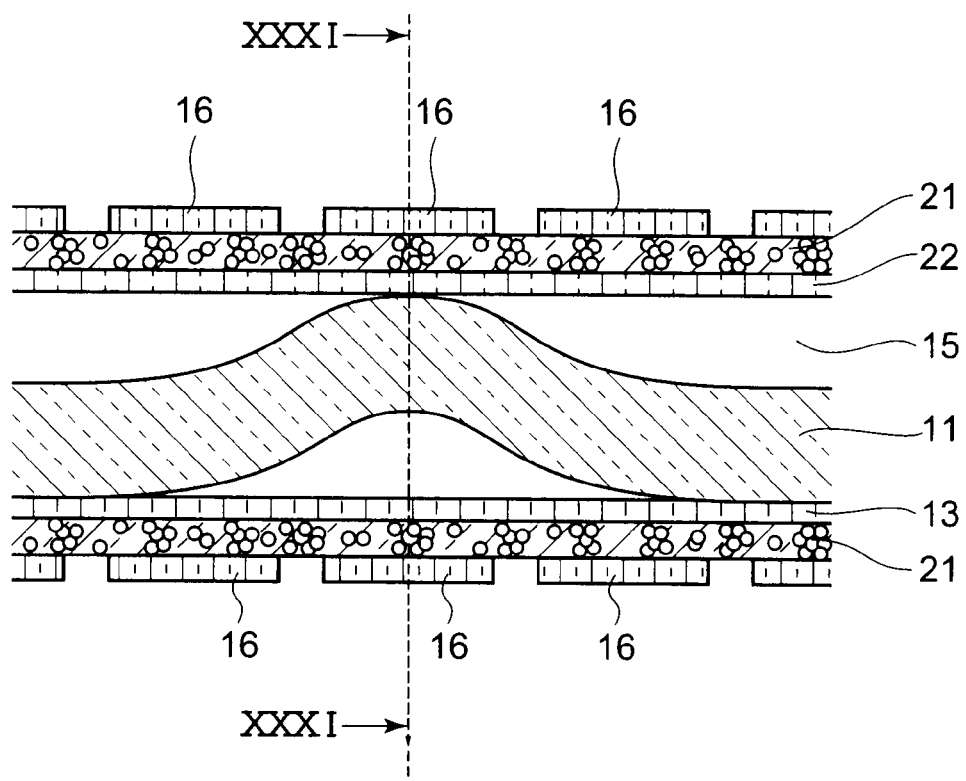
FIG. 30 is a sectional view taken along a longitudinal direction of a modified example of the optical waveguide provided with a clad including conductive particles.
Figure 31:
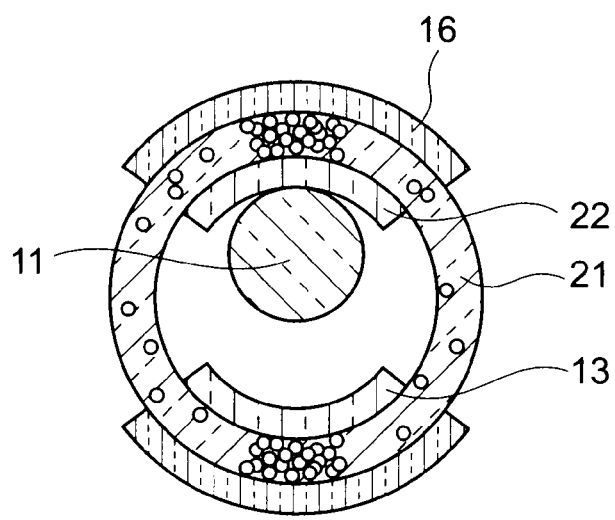
FIG. 31 is a sectional view taken along the dashed line XXXI-XXXI of FIG. 30.

In addition to the electrodes 16 (161, 162) to be formed as shown in FIGS. 9 to 11, counter electrodes 16 (164, 165) may be formed at a position facing the electrodes 16 (161, 162) on the clad 12 in the first modified example shown in FIGS. 27 to 29. Furthermore, as shown in FIGS. 30 and 31, it is possible to provide the clad 21 with an electrical conductivity by making the clad 12 contain electrically conductive particles. Thus, since a voltage drop can be controlled in the clad 21 by making the clad 12 conductive, it is possible to apply voltages efficiently. However, if the core 11 contacts the clad 21 containing the conductive particles directly at the time of the core displacements, charge migrations will occur between the clad 21 and the core 11 in this case. In order to prevent the charge migrations, it is necessary to form an insulating layer 22 on a portion where the core 11 contacts the clad 21 containing the conductive particles.

Here, the conductive particles may be introduced in order to give an anisotropic conductivity to the clad 12. Therefore, the conductive particles should just be in touch with each other to form conductive paths in a sectional direction of the clad 12. The conductive particles include silver particles, particles of semiconductive zinc oxide, etc. Moreover, the particle diameters need to be not larger than the thickness of the clad 12. When the particles are finer than the thickness of the clad 12, the particles distribution will be thin in the longitudinal direction of the clad 12 and thick in the sectional direction (radial direction) of the clad 12, as the preform is drawn in its longitudinal direction to form the clad 12. This provides the clad 12 with an anisotropic conductivity. The conductivity tends to be low and high in the longitudinal and radial directions, respectively. It is required to prevent charge migrations between the core 11 and the conductive clad 12 that are in contact with each other. It is, therefore, preferable that the insulating layer 22 with a resistance as high as $10^{11}$ Q is inserted between the core 11 and the clad 12.

In addition, when fine particles of zinc oxide are used, the particles can have both functions of light scattering and electrically conducting.

Figure 32:
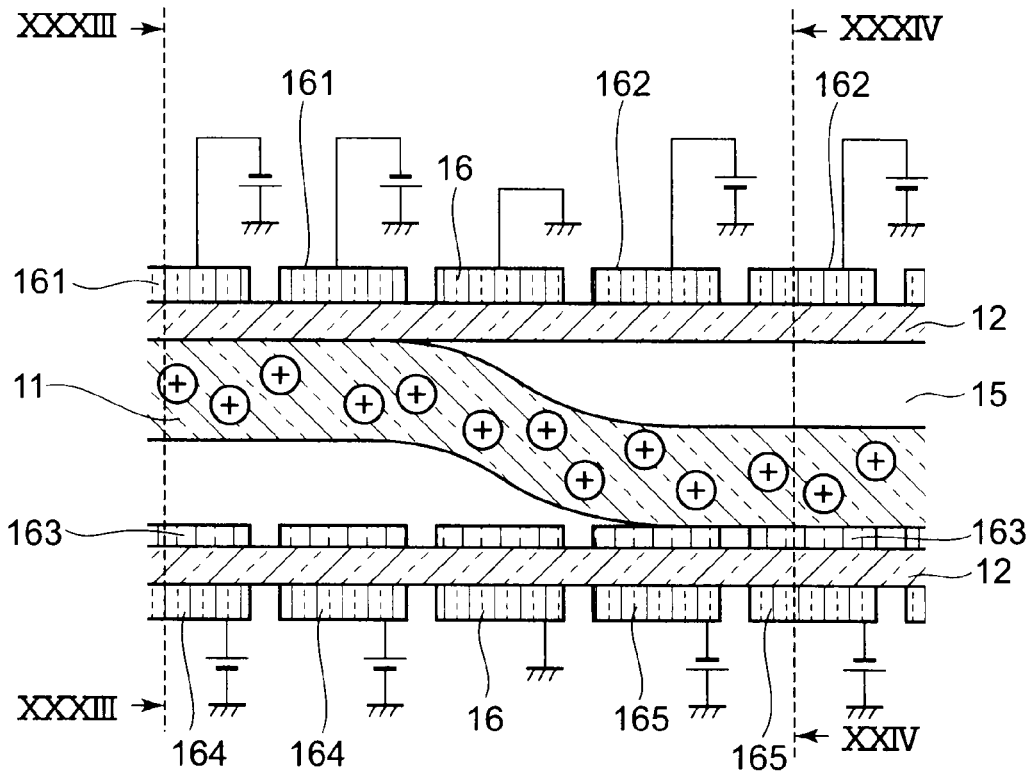
FIG. 32 is a sectional view taken along a longitudinal direction of a second modified example of the optical waveguide with a displacing structure.
Figures 33, 34:
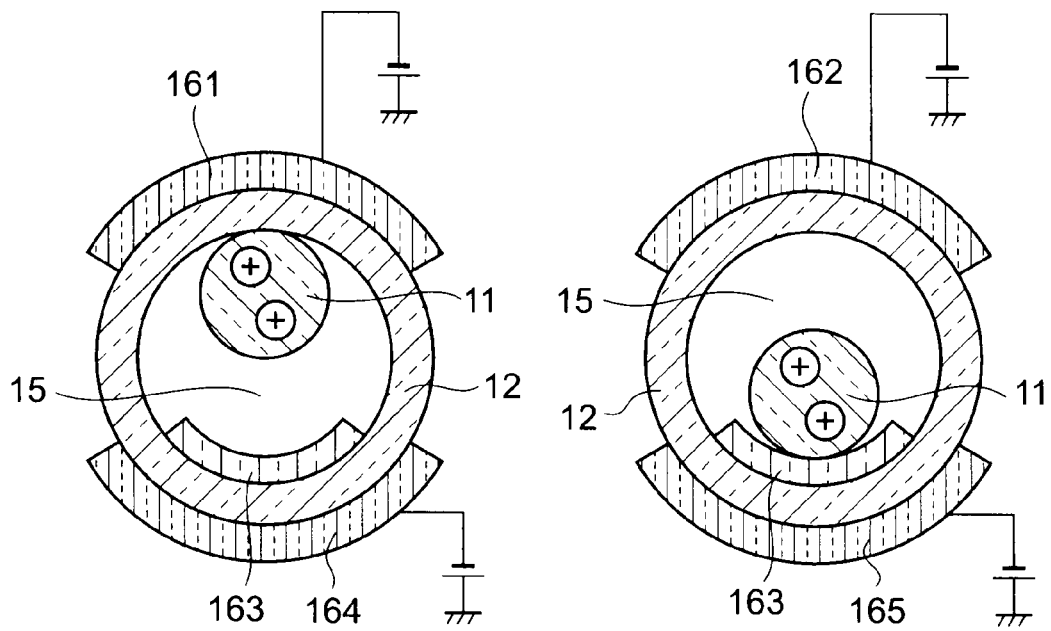
FIGS. 33 and 34 are sectional views taken along the dashed lines XXXIII-XXXIII and XXXIV-XXXIV of FIG. 32, respectively.

FIGS. 32 to 34 show a second modified example of the electrodes 16 to be formed. FIG. 32 is a sectional view taken along a longitudinal direction of a second modified example of the optical waveguide with a displacing structure. FIGS. 33 and 34 are sectional views taken along the dashed lines XXXIII-XXXIII and XXXIV-XXXIV of FIG. 32, respectively.

In addition to the electrodes 16 (161, 162, 164, 165) to be formed as shown in FIGS. 27 to 29, counter electrodes 163 may be formed on the inner wall of the clad 12 to be inserted between the core 11 and the clad 12. The counter electrodes 163 are formed at a position where the core 11 is in contact with the clad 12 when displacing the core 11 by the use of the dielectric characteristic of the clad 12, as the second modified example shown in FIGS. 32 to 34. In this case, a voltage drop does not occur in the clad 12. Voltages can be, therefore, applied efficiently. Moreover, since the core 11 is configured so as to contact the electrode 163 at positions other than the light extracting position, the core 11 does not contact the clad 12 at positions other than the light extracting position.

Figure 35:
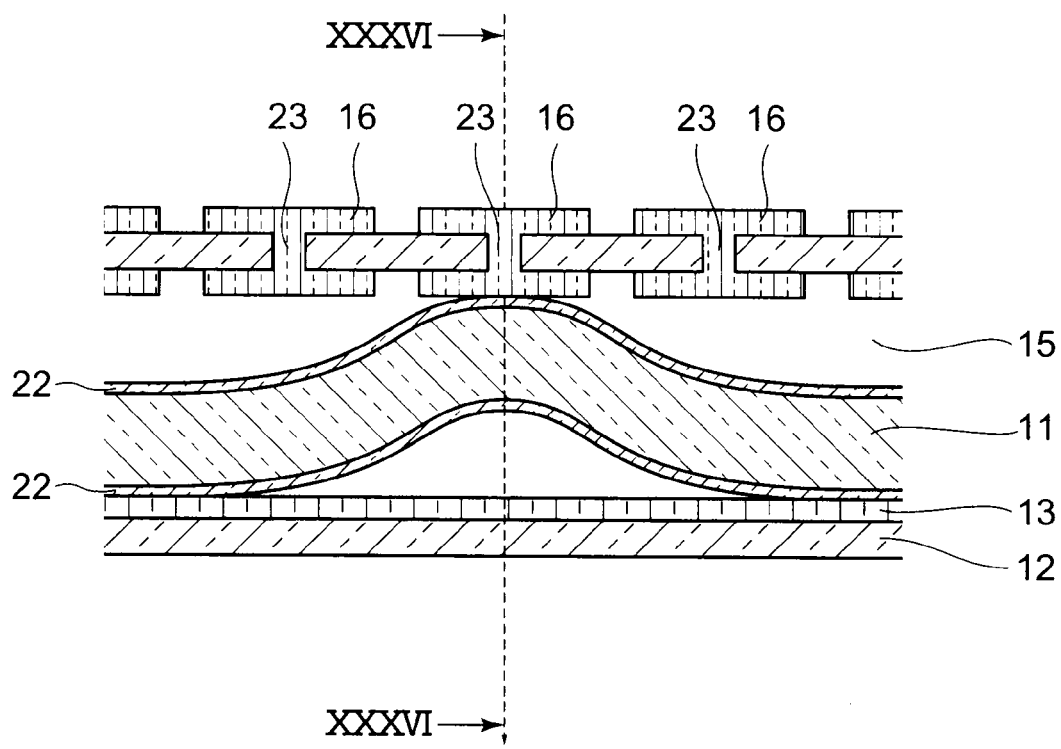
FIG. 35 is a sectional view taken along a longitudinal direction of a third modified example of the optical waveguide with a displacing structure.
Figure 36:
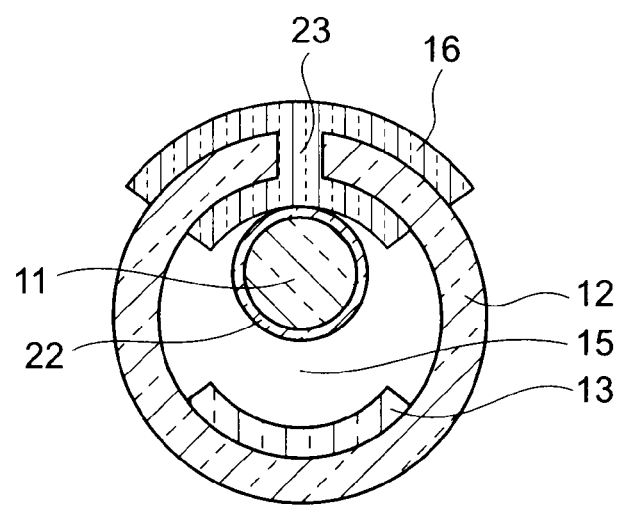
FIG. 36 is a sectional view taken along the dashed line XXXVI-XXXVI of FIG. 35.

FIGS. 35 and 36 show a third modified example of the optical waveguide. FIG. 35 is a sectional view taken along a longitudinal direction of a third modified example of the optical waveguide with a displacing structure. FIG. 36 is a sectional view taken along the dashed line XXXVI-XXXVI of FIG. 35.

The clad 12 may be provided with through-holes 23 to form the electrodes 16 integrated both sides of the clad 12 via the through-holes shown as a third modified example in FIGS. 35 and 36. Since a voltage drop does not occur in the clad 12, voltages can be applied without voltage distributions even in this case. However, it is necessary to cover the core 11 with an insulating layer 22 in order to prevent the core 11 from contacting the electrode 16 directly at the time of displacing the core 11.

The displacing structure has been described above. It is furthermore possible to insert the core 11 charged positively into the clad 12 with the electrode 16 provided, and to displace the core 11 by applying a voltage to the electrode 16. Moreover, it is also possible to use the core 11 magnetized uniformly in a direction perpendicular to the longitudinal direction of the core 11. The core thus magnetized is inserted into the clad 12 to be displaced by applying a local magnetic field to the core from the outside of the clad 12.

Figure 37A:
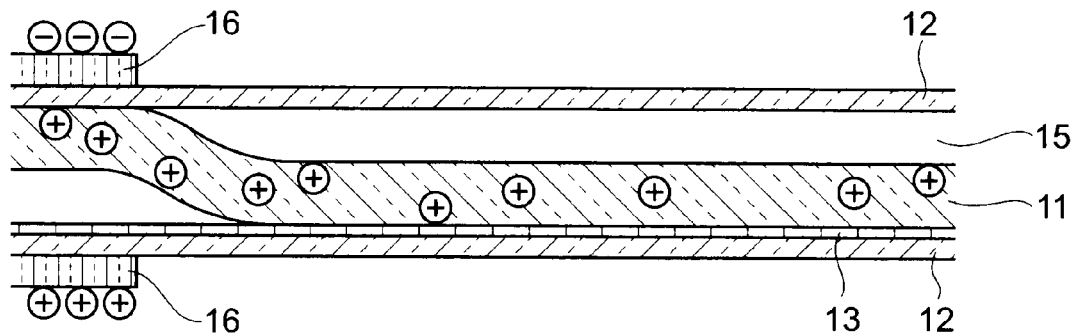
FIGS. 37A to 37C are schematic views to explain another principle for moving a light extracting position.
Figure 37B:
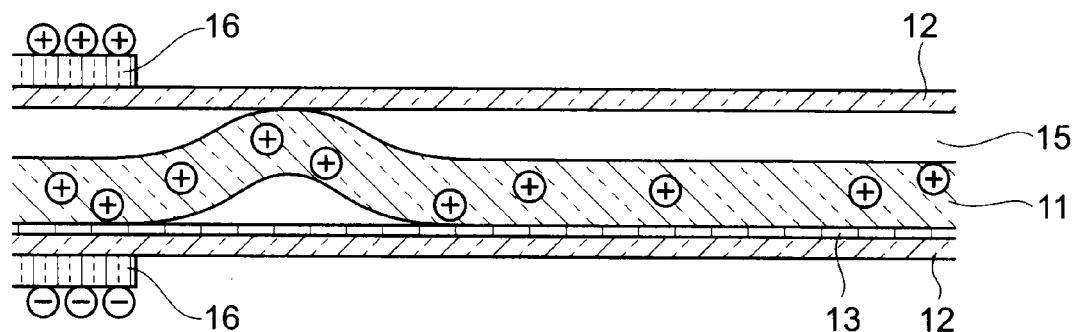
Figure 37C:
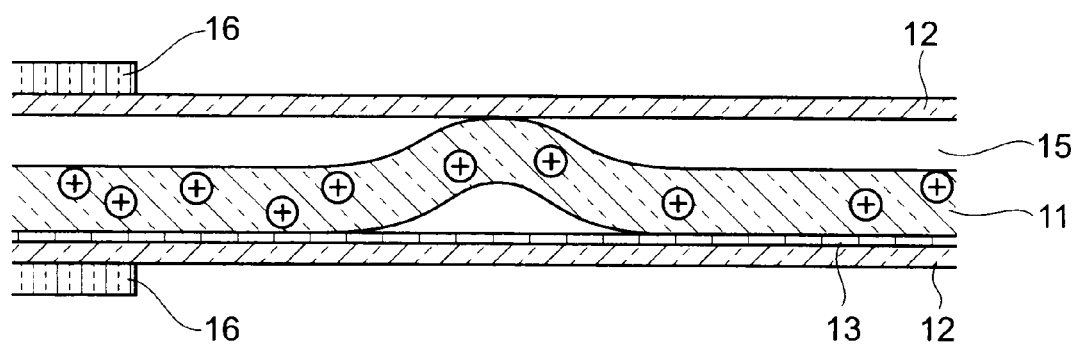

In the above-mentioned embodiment, the light extracting position has been moved by adjusting polarity and timings of voltage applications to the two or more electrodes 16. Moreover, it is also possible to move the light extracting position by the use of just one electrode 16 in the end of the optical waveguide as follows. After displacing the core 11 in this end to make the core 11 contact the clad 12 as shown in FIG. 37A, the core 11 is released from the clad 12 to move the contact point as shown in FIGS. 37B and 37C. Even in this case, the contact point between the core 11 and the clad 12 may travel, allowing the light extracting position to also travel. Moreover, a traveling speed of the contact point may be controlled depending on a switching speed of the polarity and value of the applied voltage.

The embodiments of the present invention have been described above. However, the present invention is not limited to the embodiments described above. For example, when those skilled in the art appropriately select to combine two or more of the examples as described above from a known range, and the same effect as described above can be obtained, they are also incorporated in the present invention.

What is claimed is:
1. An optical waveguide, comprising:
   a core,
   a clad, a space being provided between the core and the clad, the space containing at least one of gas and a liquid arranged such that the core can be displaced relative to the clad; and
   a displacing structure to make the core contact the clad, wherein the core has a first refractive index, the clad has a high refractive-index portion with a second refractive index higher than the first refractive index.

2. The waveguide according to claim 1, further comprising:
a low refractive-index portion with a third refractive index lower than the first refractive index, the low refractive-index portion being disposed between the core and the clad.

3. The waveguide according to claim 1, wherein the clad contains light scattering particles.

4. The waveguide according to claim 1, wherein the clad contains conductive particles.

5. The waveguide according to claim 1, wherein light guided by the core is extracted partially or entirely from the high refractive-index portion of the clad in contact with the core.

6. The waveguide according to claim 2, wherein light guided by the core is extracted partially or entirely from the high refractive-index portion of the clad in contact with the core.

7. The waveguide according to claim 3, wherein light guided by the core is extracted partially or entirely from the high refractive-index portion of the clad in contact with the core.

8. The waveguide according to claim 4, wherein light guided by the core is extracted partially or entirely from the high refractive-index portion of the clad in contact with the core.

9. The waveguide according to claim 1, wherein the displacing structure is an electric-field applying structure.

10. The waveguide according to claim 9, wherein light guided by the core is extracted partially or entirely from the high refractive-index portion of the clad in contact with the core.

11. The waveguide according to claim 1, wherein the displacing structure continuously moves a contact point between the low refractive-index portion and the clad with time.

12. The waveguide according to claim 11, wherein light guided by the core is extracted partially or entirely from the high refractive-index portion of the clad in contact with the core.

* * * * *